(12) United States Patent
Komori et al.

(10) Patent No.: US 10,324,534 B2
(45) Date of Patent: Jun. 18, 2019

(54) INFORMATION PROCESSING APPARATUS, INFORMATION PROCESSING SYSTEM, AND INFORMATION PROCESSING METHOD FOR HAPTIC OUTPUT BASED ON DISTANCE-RELATED DELAY

(71) Applicant: SONY CORPORATION, Tokyo (JP)

(72) Inventors: Akihiro Komori, Tokyo (JP); Yusuke Nakagawa, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/813,296

(22) Filed: Nov. 15, 2017

(65) Prior Publication Data
US 2018/0074590 A1 Mar. 15, 2018

Related U.S. Application Data

(63) Continuation of application No. 14/626,793, filed on Feb. 19, 2015, now Pat. No. 9,904,367.

(30) Foreign Application Priority Data

Mar. 3, 2014 (JP) ................................ 2014-040499

(51) Int. Cl.
G06F 3/01 (2006.01)
G06F 3/0346 (2013.01)
A63F 13/285 (2014.01)
A63F 13/57 (2014.01)

(52) U.S. Cl.
CPC ............ *G06F 3/016* (2013.01); *A63F 13/285* (2014.09); *A63F 13/57* (2014.09); *G06F 3/0346* (2013.01); *G06F 2203/015* (2013.01)

(58) Field of Classification Search
CPC .. G06F 3/016; G06F 2203/015; G06F 3/0346; A63F 13/20; A63F 13/219; A63F 13/285; A63F 13/55; A63F 13/56; A63F 13/57; A63F 13/573; A63F 13/577; A63F 13/23; A63F 13/60
See application file for complete search history.

(56) References Cited

U.S. PATENT DOCUMENTS

| | | | |
|---|---|---|---|
| 6,579,183 B1 * | 6/2003 | Hiromi | A63F 13/10 463/30 |
| 6,664,965 B1 | 12/2003 | Yamamoto et al. | |
| 8,378,997 B2 | 2/2013 | Kuroki et al. | |

(Continued)

FOREIGN PATENT DOCUMENTS

JP      2009-072600 A      4/2009

OTHER PUBLICATIONS

Non Final Office Action for U.S. Appl. No. 14/626,793, dated Sep. 29, 2016, 28 pages.

(Continued)

*Primary Examiner* — Darlene M Ritchie
(74) *Attorney, Agent, or Firm* — Chip Law Group

(57) ABSTRACT

There is provided an information processing apparatus including a delay amount decision unit configured to decide a delay amount of a haptic output from occurrence of an event on the basis of an event occurring position in a virtual space, and a haptic output control unit configured to delay the haptic output according to the delay amount decided by the delay amount decision unit.

18 Claims, 10 Drawing Sheets

(56) References Cited

U.S. PATENT DOCUMENTS

| | | |
|---|---|---|
| 8,754,758 B1 | 6/2014 | Ullrich et al. |
| 9,216,352 B2 | 12/2015 | Bae |
| 2003/0067440 A1* | 4/2003 | Rank ................. G06F 3/016 345/156 |
| 2003/0068053 A1* | 4/2003 | Chu ................... G06F 3/016 381/118 |
| 2008/0248872 A1* | 10/2008 | Endo ................... A63F 13/10 463/36 |
| 2009/0079690 A1* | 3/2009 | Watson ............... A63F 13/02 345/156 |
| 2009/0104995 A1 | 4/2009 | Matsuyama et al. |
| 2009/0128306 A1* | 5/2009 | Luden ................ G06F 3/016 340/407.1 |
| 2010/0261526 A1* | 10/2010 | Anderson ........... G06F 3/017 463/31 |
| 2011/0014977 A1 | 1/2011 | Yamazaki et al. |
| 2011/0244956 A1 | 10/2011 | Sakakibara et al. |
| 2012/0036433 A1 | 2/2012 | Zimmer et al. |
| 2012/0105438 A1 | 5/2012 | Huang et al. |
| 2013/0038603 A1* | 2/2013 | Bae ..................... G06F 3/016 345/419 |
| 2013/0182858 A1 | 7/2013 | You et al. |
| 2013/0234956 A1* | 9/2013 | Sanada ............... G06F 3/016 345/173 |
| 2014/0157122 A1* | 6/2014 | Matsuo ............... G06F 3/016 715/702 |
| 2015/0130707 A1 | 5/2015 | Da Costa et al. |

OTHER PUBLICATIONS

Final Office Action for U.S. Appl. No. 14/626,793, dated Mar. 20, 2017, 25 pages.

Advisory Action for U.S. Appl. No. 14/626,793, dated Jun. 12, 2017, 04 pages.

Notice of Allowance for U.S. Appl. No. 14/626,793, dated Aug. 14, 2017, 08 pages.

\* cited by examiner

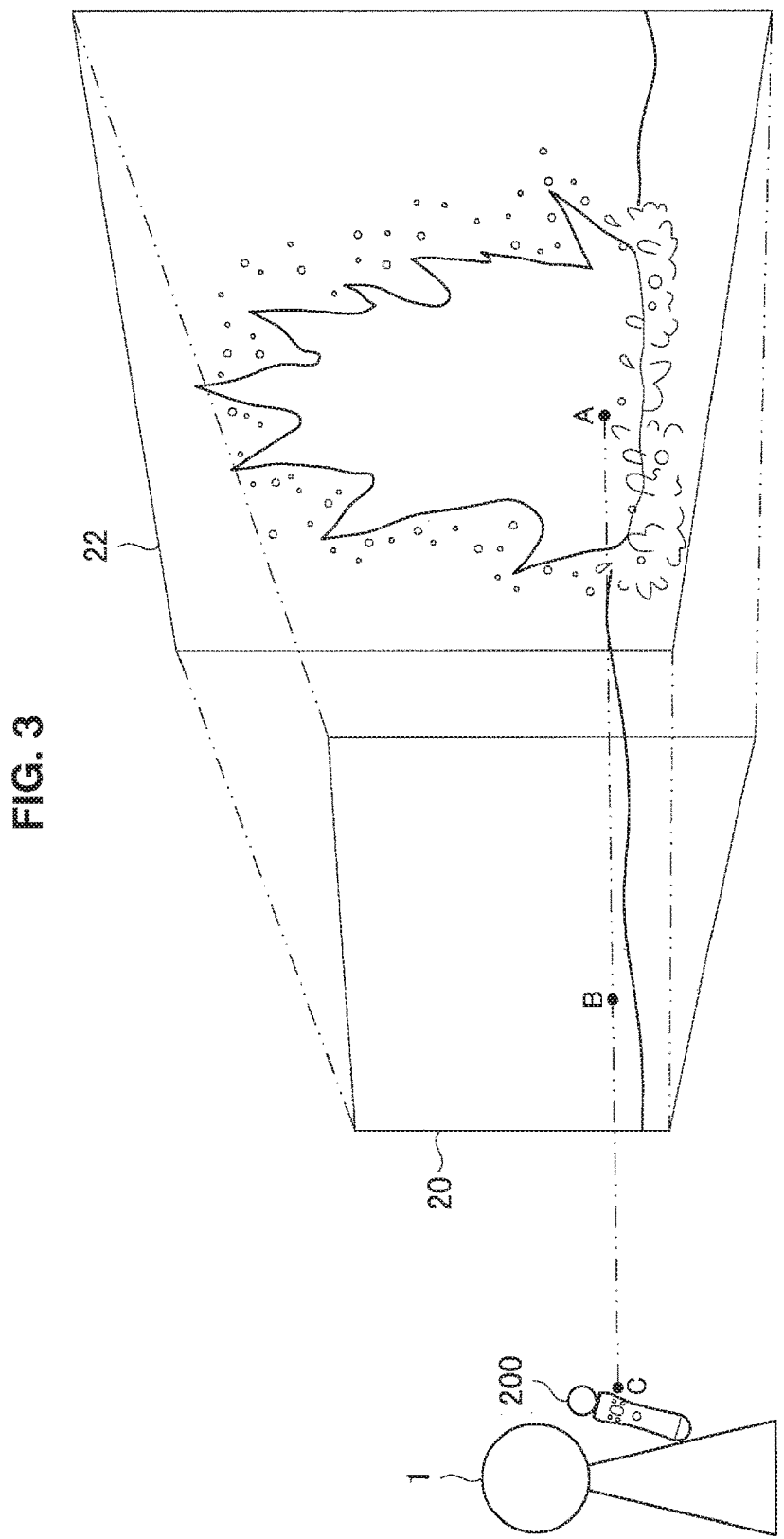

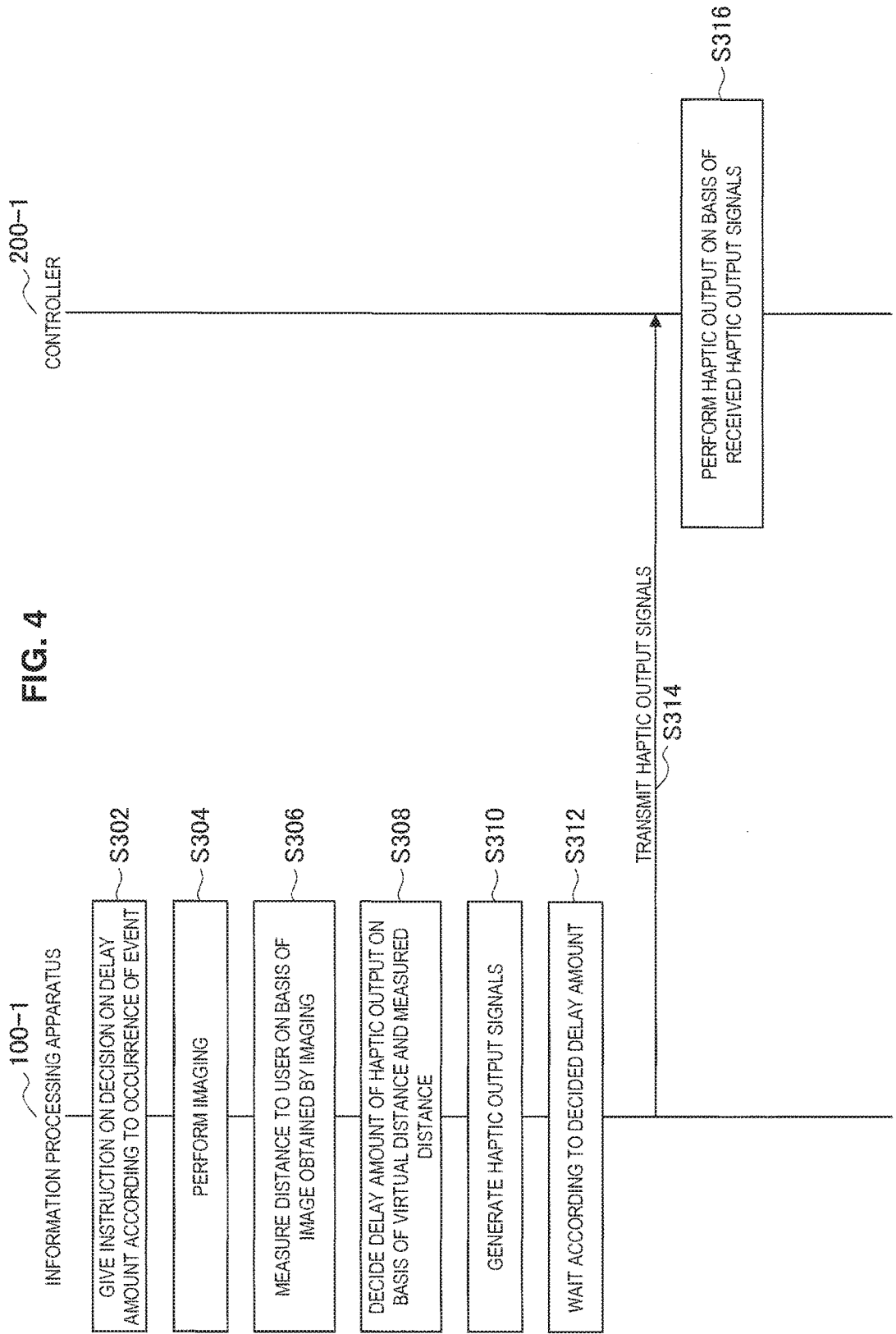

FIG. 5

100-1 INFORMATION PROCESSING APPARATUS 200-1 CONTROLLER

S302 GIVE INSTRUCTION ON DECISION ON DELAY AMOUNT ACCORDING TO OCCURRENCE OF EVENT

S304 PERFORM IMAGING

S306 MEASURE DISTANCE TO USER ON BASIS OF IMAGE OBTAINED BY IMAGING

S308 DECIDE DELAY AMOUNT OF HAPTIC OUTPUT ON BASIS OF VIRTUAL DISTANCE AND MEASURED DISTANCE

S402 CORRECT DELAY AMOUNT

S310 GENERATE HAPTIC OUTPUT SIGNALS

S404 WAIT ACCORDING TO CORRECTED DELAY AMOUNT

S314 TRANSMIT HAPTIC OUTPUT SIGNALS

S316 PERFORM HAPTIC OUTPUT ON BASIS OF RECEIVED HAPTIC OUTPUT SIGNALS

INFORMATION PROCESSING APPARATUS, INFORMATION PROCESSING SYSTEM, AND INFORMATION PROCESSING METHOD FOR HAPTIC OUTPUT BASED ON DISTANCE-RELATED DELAY

CROSS REFERENCE TO RELATED APPLICATIONS

The present application is a continuation application of U.S. patent application Ser. No. 14/626,793, filed Feb. 19, 2015 which claims the benefit of priority from Japanese Patent Application JP 2014-040499 filed Mar. 3, 2014, the entire contents of which are incorporated herein by reference.

BACKGROUND

The present disclosure relates to an information processing apparatus, an information processing system, an information processing method, and a program. In order to increase a sense of reality of content such as a movie or a video game, a technique to give users a haptic output such as vibrations according to moving images or sounds has been commonly used in recent years. Accordingly, products related to such a technique have been becoming commercially available.

For example, JP 2009-72600A discloses an apparatus that monitors audio signals, video signals, data signals, and the like outputted from software, and when these signals satisfy predetermined conditions, outputs sensory control signals to a vibration sensory actuator, for example.

SUMMARY

In order to further increase the sense of reality of content, it has been demanded that a haptic output be delayed on the basis of the position where an event occurs (an event occurring position) in a virtual space of content.

Accordingly, the present disclosure provides an information processing apparatus, an information processing system, an information processing method, and a program which can increase a sense of distance from an event that occurs in a virtual space, by using a haptic output.

According to an embodiment of the present disclosure, there is provided an information processing apparatus including a delay amount decision unit configured to decide a delay amount of a haptic output from occurrence of an event on the basis of an event occurring position in a virtual space, and a haptic output control unit configured to delay the haptic output according to the delay amount decided by the delay amount decision unit.

According to another embodiment of the present disclosure, there is provided an information processing method including deciding a delay amount of a haptic output from occurrence of an event on the basis of an event occurring position in a virtual space, and delaying the haptic output according to the decided delay amount.

According to another embodiment of the present disclosure, there is provided a program for causing a computer to realize a delay amount decision function of deciding a delay amount of a haptic output from occurrence of an event on the basis of an event occurring position in a virtual space, and a haptic output control function of delaying the haptic output according to the delay amount decided by the delay amount decision function.

As described above, according to one or more of embodiments of the present disclosure, there are provided an information processing apparatus, an information processing system, an information processing method, and a program which can increase a sense of distance from an event that occurs in a virtual space, by using a haptic output. Note that the effects described above are not necessarily limited, and along with or instead of the effects, any effect that is desired to be introduced in the present specification or other effects that can be expected from the present specification may be exhibited

BRIEF DESCRIPTION OF THE DRAWINGS

FIG. 3 shows processing of decision on a delay amount of an information processing apparatus according to an embodiment;

FIG. 4 is a sequence diagram conceptually showing processing of an information processing system according to an embodiment;

FIG. 5 is a sequence diagram conceptually showing processing of an information processing system according to an embodiment;

DETAILED DESCRIPTION OF THE EMBODIMENTS

Figure 1:
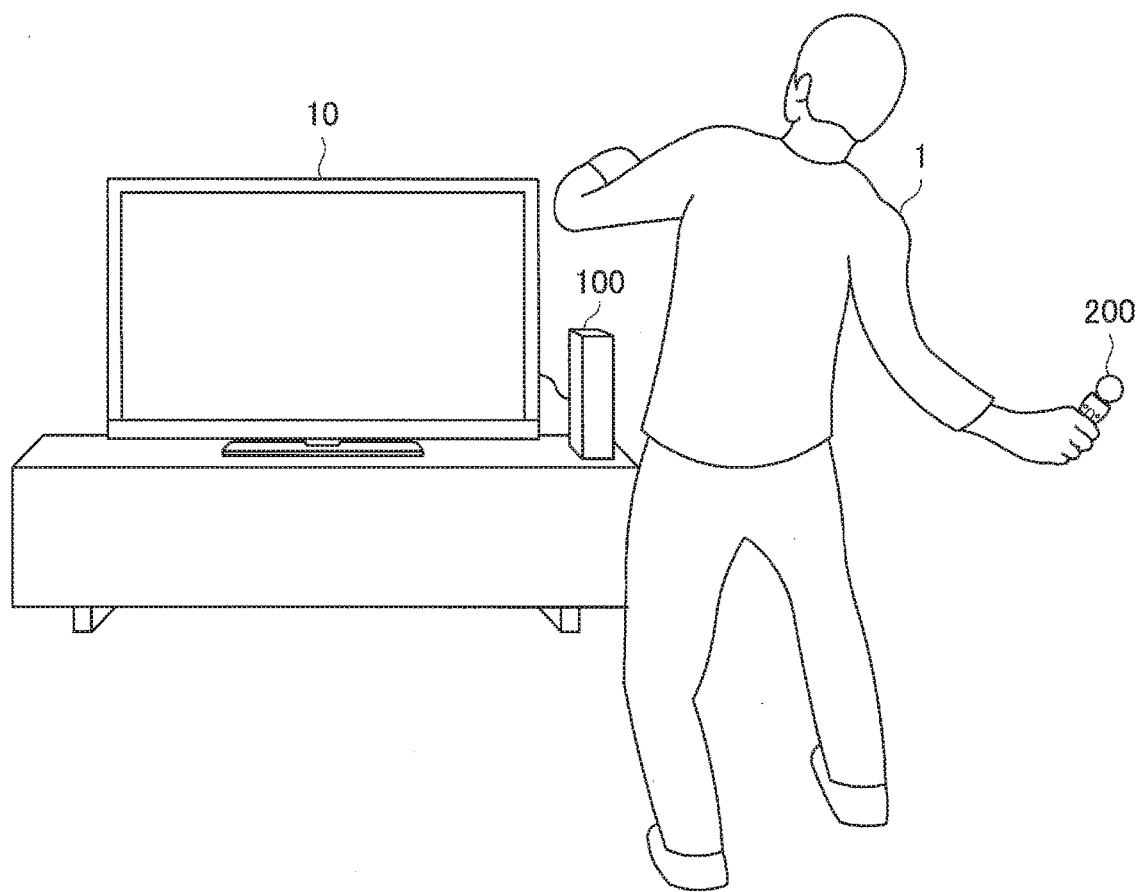
FIG. 1 illustrates an outline of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Outline of information processing system according to embodiment of present disclosure
2. First embodiment of present disclosure (example of delay control of haptic output)
   2-1. Configuration of information processing system
   2-2. Processing of information processing system
   2-3. Modification example
3. Second embodiment of present disclosure (example of delay control of haptic output and sound output)
   3-1. Configuration of information processing system
   3-2. Processing of information processing system 3-3. Modification example
4. Third embodiment of present disclosure (example of performing output control in controller)
   4-1. Configuration of information processing system
   4-2. Processing of information processing system
5. Hardware Configuration
6. Conclusion

1. Outline of Information Processing System According to Embodiment of Present Disclosure First, an outline of an information processing system according to an embodiment of the present disclosure will be described with reference to FIG. 1. FIG. 1 illustrates the outline of the information processing system according to an embodiment of the present disclosure.

The information processing system includes an information processing apparatus 100 and a controller 200. The information processing apparatus 100 is a stationary apparatus and has a function of performing processing for a virtual space, a function of performing processing of generating information for a haptic output on the basis of the result of the above processing, and a communication function. The controller 200 is a portable apparatus that can be carried and includes an actuator that performs the haptic output and a communication function. Accordingly, in the information processing system, the information processing apparatus 100 generates information for the haptic output based on the result of processing in the virtual space, the generated information is transmitted to the controller 200, and the controller 200 can perform the haptic output on the basis of the received information.

Further, the controller 200 has a function of detecting a user's operation, and transmits information related to the detected operation to the information processing apparatus 100. Further, the information processing apparatus 100 has a function of detecting the distance from a display screen to the user. Accordingly, in the information processing system, the information processing apparatus 100 can perform processing in the virtual space on the basis of the information related to the user's operation and the distance from the display screen to the user, which are detected by the controller 200.

For example, as shown in FIG. 1, the information processing system can be composed of the information processing apparatus 100 connected to a display apparatus 10 and the controller 200 to be operated by a user 1. The information processing apparatus 100 can provide information related to the result of processing for the virtual space, such as a three-dimensional moving image, to the display apparatus 10, and the display apparatus 10 can display the provided moving image. The information processing apparatus 100 can also generate haptic output signals on the basis of the event and the like that have occurred in the virtual space, and can transmit the generated haptic output signals to the controller 200. The controller 200 can operate a haptic output actuator on the basis of the received haptic output signals.

The controller 200 can also detect an operation by the user 1, such as pressing of a button or displacement of the controller 200, and can transmit information related to the detected operation to the information processing apparatus 100. The information processing apparatus 100 can detect the distance from the display apparatus 10 to the user 1, and can perform processing for the virtual space on the basis of the received information and the detected distance.

Here, in a case in which an event occurs in the virtual space, for example, if a haptic output is performed arbitrarily while an image in which the event occurring position seems to be away in the virtual space is outputted to the display apparatus 10, the user may experience a feeling of strangeness. Accordingly, in the information processing system, on the basis of the event occurring position in the virtual space, the haptic output for the occurrence of the event is delayed.

For example, in a case in which an explosion event occurs in the virtual space and processing for making the user feel the blast due to the explosion is performed, the information processing apparatus 100 calculates a delay time until the blast reaches the position of the user in the virtual space on the basis of the position where the explosion occurs. Further, the information processing apparatus 100 outputs a moving image related to the explosion to the display apparatus 10, and the display apparatus 10 displays the moving image. Then, after the calculated delay time elapses, the information processing apparatus 100 transmits the haptic output signals to the controller 200, and the controller 200 performs the haptic output on the basis of the received haptic output signals.

In this manner, the information processing system according to an embodiment of the present disclosure delays the haptic output for the occurrence of the event on the basis of the event occurring position in the virtual space. Accordingly, it becomes possible to increase a sense of distance from the event occurring position by using the haptic output. Note that the information processing apparatus 100 and the controller 200 according to first and second embodiments are specified by adding numbers corresponding to the number of embodiments to the end of reference numerals, such as an information processing apparatus 100-1 and an information processing apparatus 100-2, for convenience of the description.

2. First Embodiment of Present Disclosure
Example of Delay Control of Haptic Output The outline of the information processing system according to an embodiment of the present disclosure has been described above. Next, an information processing system according to the first embodiment of the present disclosure will be described. In the information processing system according to the present embodiment, the information processing apparatus 100-1 decides the delay amount of the haptic output from the occurrence of an event in the virtual space, and after a period of time based on the decided delayed amount elapses, causes a controller 200-1 to perform the haptic output.

2-1. Configuration of Information Processing System

Figure 2:
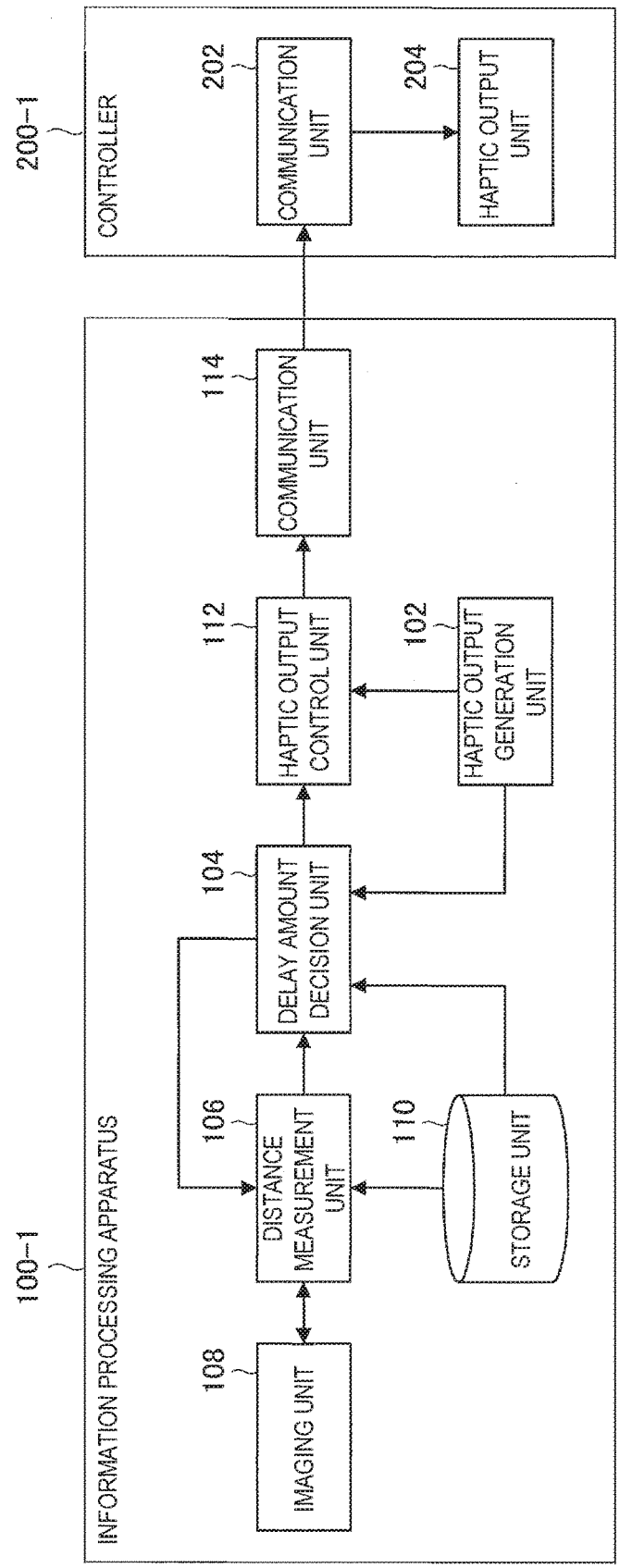
FIG. 2 is a block diagram showing a schematic functional configuration of an information processing system according to a first embodiment of the present disclosure.

First, a configuration of the information processing system according to the first embodiment of the present disclosure will be described with reference to FIG. 2. FIG. 2 is a block diagram showing a schematic functional configuration of the information processing system according to the present embodiment.

The information processing system is composed of the information processing apparatus 100-1 and the controller 200-1 as shown in FIG. 2.

The information processing apparatus 100-1 includes a haptic output generation unit 102, a delay amount decision unit 104, a distance measurement unit 106, an imaging unit 108, a storage unit 110, a haptic output control unit 112, and a communication unit 114.

The haptic output generation unit 102 generates the haptic output signals on the basis of a haptic output instruction generated according to the occurrence of an event in a virtual space. Specifically, in a case in which an event occurs in the virtual space, the haptic output instruction is generated by an application that performs processing for the virtual space, and the haptic output generation unit 102 generates the haptic output signals on the basis of the generated haptic output instruction.

Further, when the haptic output instruction is generated, the haptic output generation unit 102 instructs the delay amount decision unit 104 to decide the delay amount of the haptic output. Specifically, the haptic output generation unit 102 acquires positional information of the event that has occurred in the virtual space from the application that has generated the haptic output instruction, for example, and provides the instruction on the decision on the delay amount and the acquired positional information to the delay amount decision unit 104. Note that the positional information may be included in the haptic output instruction.

The delay amount decision unit 104 decides the delay amount of the haptic output on the basis of the instruction of the haptic output generation unit 102. Specifically, when receiving the instruction on the decision on the delay amount, delay amount decision unit 104 instructs the distance measurement unit 106 to measure the distance from the information processing apparatus 100-1 to the user.

Further, the delay amount decision unit 104 decides the delay amount of the haptic output from the occurrence of the event on the basis of the event occurring position in the virtual space. Specifically, the delay amount decision unit 104 decides the delay amount on the basis of a virtual distance from the event occurring position to a front display end surface in the virtual space and a correction distance. For example, processing of decision on the delay amount will be described in detail with reference to FIG. 3. FIG. 3 shows processing of the decision on the delay amount of the information processing apparatus 100-1 according to the present embodiment.

First, the virtual space has a width from the front display end surface to a back display end surface in the displayed virtual space. For example, as shown in FIG. 3, the displayed virtual space has a width from a front display end surface 20 to a back display end surface 22. Further, the information processing apparatus 100-1 can cause an external display apparatus, for example, to display a moving image of the virtual space in that width.

The delay amount decision unit 104 calculates the virtual distance from the event occurring position to the front display end surface of the virtual space on the basis of information on the event occurring position in the virtual space, which is provided by the haptic output generation unit 102. For example, in a case in which such an event that a water column rises from a water surface, as shown in FIG. 3, occurs in the virtual space, information of a position A of the water column, the position corresponding to the event occurring position, is provided by the haptic output generation unit 102, and the delay amount decision unit 104 calculates the virtual distance from the position A to a position B of the front display end surface 20 of the virtual space. For example, the virtual distance can be calculated by using coordinate information in the virtual space.

Next, the delay amount decision unit 104 calculates the correction distance from the front display end surface of the virtual space to the user on the basis of the distance measured by the distance measurement unit 106. For example, the distance measurement unit 106 can measure the distance from the display screen on which the moving image of the virtual space is displayed to the position of the user 1 in the real space. Then, the delay amount decision unit 104 can set the distance measured by the distance measurement unit 106 as the correction distance from the position B of the front display end surface 20 of the virtual space to a position C of the user 1, as shown in FIG. 3.

Next, the delay amount decision unit 104 decides the delay amount on the basis of the calculated virtual distance and the correction distance. For example, the delay amount decision unit 104 can add the correction distance to the calculated virtual distance to set, as the delay amount, a value obtained by dividing the thus obtained distance by a propagation speed of a phenomenon generated by the event that has occurred, such as the speed of water waves caused by the generation of the water column shown in FIG. 3. Note that the delay amount decision unit 104 may acquire the delay amount corresponding to the distance, the delay amount being stored in the storage unit 110 as a database.

In this manner, the delay amount decision unit 104 decides the delay amount of the haptic output from the occurrence of the event on the basis of the event occurring position in the virtual space. Accordingly, by the haptic output being delayed on the basis of the delay amount, it becomes possible to increase the sense of distance from the event occurring position in the virtual space. Further, the delay amount decision unit 104 decides the delay amount on the basis of the virtual distance from the event occurring position to the front display end surface of the virtual space. Accordingly, by the delay amount being decided on the basis of the distance to the front display end surface of the virtual space, which corresponds to the position of a viewpoint of the user, it becomes possible to further increase the sense of distance of the user from the event occurring position. Further, the delay amount decision unit 104 decides the delay amount on the basis of the distance obtained by adding, to the virtual distance, the distance from the display screen to the position of the user in the real space. Accordingly, by the haptic output being delayed according to the distance in the real space, it becomes possible to increase the sense of reality.

Note that the above example has shown a case in which the distance from the event occurring position to the front display end surface of the virtual space is calculated as the virtual distance; however, the virtual distance may be a distance to the position of a specific object between the display end surfaces. For example, the specific object can be a character operated by the user in the virtual space, for example. In this case, by the haptic output being delayed on the basis of the distance to the position of an object that is identified with the user, it becomes possible to increase the user's sense of reality. Further, the virtual distance may be a certain distance from the event occurring position.

The distance measurement unit 106 measures, as a distance decision unit, the distance from the display screen to the user on the basis of the instruction of the delay amount decision unit 104. Specifically, the distance measurement unit 106 measures the distance from the display screen to the position of the user on the basis of an image related to the user. For example, when receiving an instruction on measurement of the distance from the delay amount decision unit 104, the distance measurement unit 106 can instruct the imaging unit 108 to perform imaging. Further, the distance measurement unit 106 can recognize the size of the face of the user from the image captured by the imaging unit 108 and can compare the recognized size of the face with the size of a face that is away from the imaging position by a certain distance, which is stored in the storage unit 110, so as to calculate the distance from the display screen to the user.

Note that the above example has shown a case in which the distance from the display screen to the user is calculated on the basis of the size of the face; however, the distance from the display screen to the user may be calculated by using disparity information of a plurality of the imaging units 108, or may be detected by a distance measuring sensor with light, ultrasonic waves, or the like. Further, the distance may be the distance from the display screen to the controller 200-1. Specifically, a specific object as a part of the controller 200-1, e.g., a marker, is recognized from the image obtained by imaging, and the distance is calculated on the basis of the size of the recognized marker. In this case, complex face recognition processing is not necessarily performed, which can reduce a load on the processing and shorten the processing time.

The imaging unit 108 images the user and a periphery thereof. For example, the imaging unit 108 includes an imaging optical system such as a photographing lens that condenses light, and a signal conversion element such as a CCD (charge coupled device) or a CMOS (complementary metal oxide semiconductor). Note that the information processing apparatus 100-1 is desirably installed at a position near the display screen on which the imaging unit 108 displays the virtual space. Further, the information processing apparatus 100-1 may include an input unit that receives image input from an external imaging apparatus or the like, instead of the imaging unit 108, and the external imaging apparatus or the like may be disposed near the display screen.

The storage unit 110 stores information related to the distance measurement. For example, the storage unit 110 can store the size of the face, the size of the marker, and the like, which are away from the imaging position by a certain distance.

The haptic output control unit 112 controls timing of the haptic output on the basis of the delay amount of the haptic output. Specifically, after a period of time according to the delay amount decided by the delay amount decision unit 104 elapses, the haptic output control unit 112 instructs the communication unit 114 to transmit the haptic output signals generated by the haptic output generation unit 102 to the controller 200-1.

The communication unit 114 transmits the haptic output signals to the controller 200-1. Specifically, the communication unit 114 transmits the haptic output signals generated by the haptic output generation unit 102 to the controller 200-1 on the basis of the transmission instruction from the haptic output control unit 112. For example, the communication unit 114 can communicate with the controller 200-1 by radio communication such as Bluetooth (registered trademark) communication, Wi-Fi (registered trademark) communication, or infrared light communication, or wired communication via a wire or the like.

Further, the controller 200-1 includes a communication unit 202 and a haptic output unit 204 as output apparatuses.

The communication unit 202 receives the haptic output signals transmitted from the information processing apparatus 100-1.

The haptic output unit 204 performs the haptic output on the basis of the received haptic output signals. Specifically, the haptic output unit 204 generates vibrations that can be sensed by humans in a haptic manner. For example, the haptic output unit 204 can be a vibration actuator such as an eccentric motor or a linear resonant actuator (LRA) and can generate vibrations by operating a built-in motor, coil, or the like on the basis of a wave form related to the received haptic output signals. Note that the haptic output unit 204 may output heat instead of, or in addition to, the vibrations. In this case, in a case in which a phenomenon occurs regarding temperature due to the occurrence of the event in the virtual space, it becomes possible to increase the sense of reality of the phenomenon.

2-2. Processing of Information Processing System

Next, processing of the information processing system in the present embodiment will be described with reference to FIG. 4. FIG. 4 is a sequence diagram conceptually showing the processing of the information processing system according to the present embodiment.

First, the information processing apparatus 100-1 gives an instruction on the decision on the delay amount according to the occurrence of the event (step S302). Specifically, when receiving the haptic output instruction based on the event that has occurred in the virtual space from the application that performs processing for the virtual space, the haptic output generation unit 102 gives an instruction on the decision on the delay amount to the delay amount decision unit 104.

Next, the information processing apparatus 100-1 performs imaging (step S304). Specifically, the delay amount decision unit 104 that receives the instruction on the decision on the delay amount instructs the distance measurement unit 106 to measure the distance, and the distance measurement unit 106 causes the imaging unit 108 to perform imaging. Note that the distance measurement unit 106 may cause the imaging unit 108 to perform imaging regularly so as to measure the distance to the user on the basis of the imaged image.

Next, the information processing apparatus 100-1 measures the distance to the user on the basis of the image obtained by imaging (step S306). Specifically, the distance measurement unit 106 recognizes the face of the user from the image obtained by imaging by the imaging unit 108, and compares the size of the face with the size of a face that is away from the imaging position by a certain distance, which is stored in the storage unit 110, so as to measure the distance from the display screen to the user.

Next, the information processing apparatus 100-1 decides the delay amount of the haptic output on the basis of the virtual distance and the measured distance (step S308). Specifically, the delay amount decision unit 104 calculates the virtual distance from the event occurring position to the front display end surface, and decides the delay amount on the basis of the distance obtained by adding the distance measured by the distance measurement unit 106 to the virtual distance and the speed at which the phenomenon generated by the event that has occurred is propagated.

Next, the information processing apparatus 100-1 generates the haptic output signals (step S310). Specifically, the haptic output generation unit 102 generates the haptic output signals on the basis of the haptic output instruction from the application.

Next, the information processing apparatus 100-1 waits according to the decided delay amount (step S312). Specifically, the haptic output control unit 112 waits to cause the communication unit 114 to transmit the haptic output signals until a period of time corresponding to the delay amount decided by the delay amount decision unit 104 elapses.

Next, the information processing apparatus 100-1 transmits the haptic output signals to the controller 200-1 (step S314). Specifically, the communication unit 114 transmits the haptic output signals to the controller 200-1 on the basis of a transmission instruction of the haptic output control unit 112.

Next, the controller 200-1 performs the haptic output on the basis of the received haptic output signals (step S316). Specifically, the haptic output unit 204 generates vibrations on the basis of the haptic output signals received by the communication unit 202.

In this manner, according to the first embodiment of the present disclosure, the information processing system decides the delay amount of the haptic output from the occurrence of the event on the basis of the event occurring position in the virtual space, and delays the haptic output according to the decided delay amount. Accordingly, the timing of the haptic output is changed by the event occurring position in the virtual space, and it becomes possible to increase the user's sense of distance to the event that occurs in the virtual space.

2-3. Modification Example

The first embodiment of the present disclosure has been described above. Note that the present embodiment is not limited to the above example. First to fourth modification examples of the present embodiment will be described below.

First Modification Example

As the first modification example of the present embodiment, the correction distance may be a set certain distance. Specifically, the correction distance is a value set by a user's operation. For example, operation on a GUI (graphical user interface) provided for the user by the information processing apparatus 100-1 can enable selectin of the correction distance, and the selected correction distance can be stored in the storage unit 110. Further, the delay amount decision unit 104 can acquire the stored correction distance to use it in the decision on the delay amount. Note that the value selected by the user may be added to or subtracted from the correction distance as a reference.

In this manner, according to the first modification example of the present embodiment, the set certain distance is used as the correction distance in the processing of the decision on the delay amount. Accordingly, since the processing by the distance measurement unit 106 and the imaging unit 108 is omitted, it becomes possible to reduce the load on the processing and to increase the processing speed. Further, the correction distance is set by the user's operation. Accordingly, the user can change the correction distance according to the use environment of the user, for example, and it becomes possible to increase the convenience of the user.

Note that the correction distance may be a fixed value that is stored in the storage unit 110 in advance. For example, the fixed value may be a common viewing distance from the display screen. In this case, it is unnecessary for the information processing apparatus 100-1 to include a function of providing a GUI or the like, and it becomes possible to reduce computational resources and cost for the apparatus.

Second Modification Example

As the second modification example of the present embodiment, the delay amount decision unit 104 may decide the delay amount on the basis of a medium of the virtual space. Specifically, the delay amount decision unit 104 sets, as the delay amount, the distance obtained by, adding the correction distance to the calculated virtual distance and dividing the thus obtained distance by the propagation speed corresponding to the medium related to the propagation of the phenomenon generated by the event that has occurred. For example, the delay amount decision unit 104 can decide the delay amount by setting the propagation speed to 1500 m/s in a case in which side waves of vibrations generated by the event are propagated through water, or by setting the propagation speed to 1000 m/s in a case in which side waves of vibrations are propagated through a string, such as nylon. The propagation speed corresponding to each medium can be stored in the storage unit 110.

In this manner, according to the second modification example of the present embodiment, the delay amount decision unit 104 decides the delay amount on the basis of the medium of the virtual space. Accordingly, since the propagation speed of the phenomenon generated by the event is varied according to the medium through which the phenomenon propagates, it becomes possible to increase the sense of reality.

Third Modification Example

As the third example of the present embodiment, the delay amount decision unit 104 may decide the delay amount by using a value obtained by multiplying the virtual distance and the measured distance by a certain value for scale-down. Specifically, the delay amount decision unit 104 multiplies the value obtained by adding the measured distance to the virtual distance by a certain value for scale-down, and calculates the delay amount by dividing the value obtained by the multiplication by the propagation speed of the phenomenon generated by the event that has occurred. For example, in a case in which the scale of the virtual space is set to a scale ten times as large as the real space, the delay amount decision unit 104 calculates the delay amount by adding the measured distance to the virtual distance, by multiplying the thus obtained value by ten times, and by dividing the value by the propagation speed of the phenomenon generated by the event that has occurred.

In this manner, according to the third modification example of the present embodiment, the delay amount decision unit 104 decides the delay amount by using the value obtained by multiplying the virtual distance and the measured distance by the certain value for scale-down. Accordingly, since the sense of distance is changed by the scaling value, it becomes possible to make a user experience a feeling as if the user became bigger or smaller.

Fourth Modification Example

As the fourth modification example of the present embodiment, the delay amount decided by the delay amount decision unit 104 may be corrected by a user's operation. Specifically, by operations of the GUI or the like provided by the information processing apparatus 100-1 to the user, a correction value related to the delay amount of the haptic output is set, and the set correction value can be stored in the storage unit 110. Then, the delay amount decision unit 104 acquires the stored correction value and corrects the decided delay amount. For example, correction processing of the delay amount by such setting will be described in detail with reference to FIG. 5. FIG. 5 is a sequence diagram conceptually showing the processing of the information processing system according to the fourth modification example of the present embodiment. Note that a description of substantially the same processing as that of the information processing system in the present embodiment will be omitted.

First, the information processing apparatus 100-1 gives an instruction on the decision on the delay amount according to the occurrence of the event (step S302), performs imaging (step S304), and then measures the distance to the user on the basis of the image obtained by imaging (step S306). Then, the information processing apparatus 100-1 decides the delay amount of the haptic output on the basis of the virtual distance and the measured distance (step S308).

Next, the information processing apparatus 100-1 corrects the delay amount (step S402). Specifically, the delay amount decision unit 104 acquires the correction value of the delay amount from the storage unit 110, the correction value being set by the user in advance, and on the basis of the acquired correction value, corrects the decided delay amount.

Next, the information processing apparatus 100-1 generates the haptic output signals (step S310).

Next, the information processing apparatus 100-1 waits according to the corrected delay amount (step S404). Specifically, the haptic output control unit 112 waits to cause the communication unit 114 to transmit the haptic output signals until a period of time corresponding to the delay amount corrected by the delay amount decision unit 104 elapses.

Next, the information processing apparatus 100-1 transmits the haptic output signals to the controller 200-1 (step S314), and the controller 200-1 performs the haptic output on the basis of the received haptic output signals (step S316).

In this manner, according to the fourth modification example of the present embodiment, the delay amount decision unit 104 corrects the decided delay amount on the basis of the value set by the user. Accordingly, in a case in which the presence and absence and value of delayed moving images are different depending on display apparatuses, for example, the user can change the delay amount according to the use environment of the user, and it becomes possible to increase the convenience of the user.

3. Second Embodiment of Present Disclosure
Example of Delay Control of Haptic Output and Sound Output Next, an information processing system according to the second embodiment of the present disclosure will be described. In the information processing system according to the present embodiment, the information processing apparatus 100-2 decides independently each delay amount of the haptic output and the sound output from the occurrence of the event in the virtual space, and causes a controller 200-2 to perform each of the haptic output and the sound output after a period of time based on each decided delay amount elapses.

3-1. Configuration of Information Processing System

Figure 6:
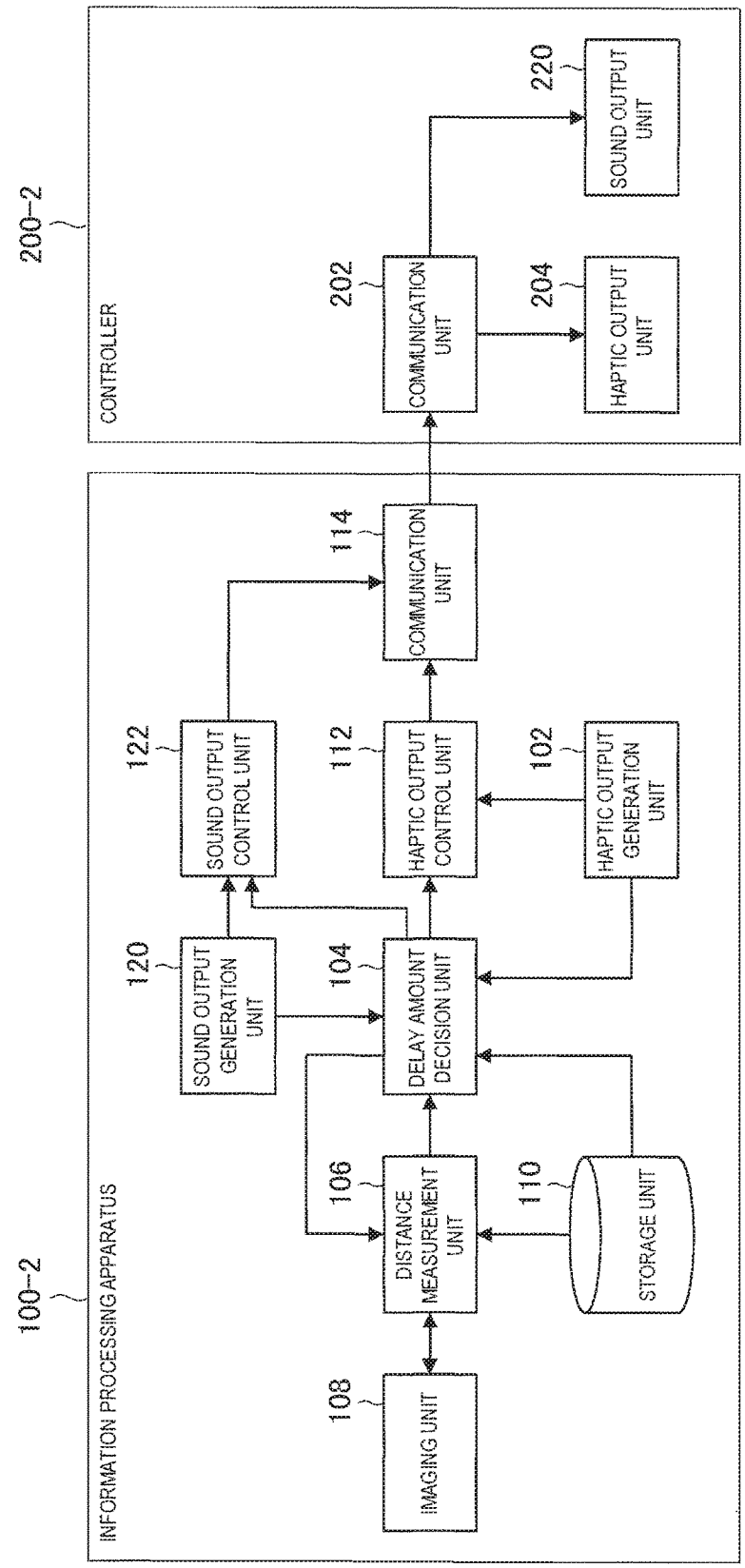
FIG. 6 is a block diagram showing a schematic functional configuration of an information processing system according to a second embodiment of the present disclosure.

First, a configuration of the information processing system according to the second embodiment of the present disclosure will be described with reference to FIG. 6. FIG. 6 is a block diagram showing a schematic functional configuration of the information processing system according to the present embodiment.

As shown in FIG. 6, the information processing apparatus 100-2 includes, in addition to the haptic output generation unit 102, the delay amount decision unit 104, the distance measurement unit 106, the imaging unit 108, the storage unit 110, the haptic output control unit 112, and the communication unit 114, a sound output generation unit 120 and a sound output control unit 122.

The sound output generation unit 120 generates the sound output signals on the basis of a sound output instruction generated according to the occurrence of the event in the virtual space. Specifically, in a case in which the event occurs in the virtual space, an application that performs processing for the virtual space generates the sound output instruction, and the sound output generation unit 120 generates the sound output signals on the basis of the generated sound output instruction.

When the sound output instruction is generated, the sound output generation unit 120 instructs the delay amount decision unit 104 to decide the delay amount of the sound output. Specifically, the sound output generation unit 120 acquires positional information of the event that has occurred in the virtual space from the application that has generated the sound output instruction, for example, and provides the instruction on the decision on the delay amount and the acquired positional information to the delay amount decision unit 104. Note that the positional information may be included in the sound output instruction.

The delay amount decision unit 104 decides the delay amount of the sound output on the basis of the instruction of the sound output generation unit 120. Decision processing of the delay amount is substantially the same as that in the first embodiment, and therefore a description thereof is omitted here. Note that the delay amount decision unit 104 decides the delay amount of the sound output independently of the decision on the delay amount of the haptic output.

The sound output control unit 122 controls timing of the sound output on the basis of the delay amount of the sound output. Specifically, after a period of time according to the delay amount decided by the delay amount decision unit 104 elapses, the sound output control unit 122 instructs the communication unit 114 to transmit the sound output signals generated by the sound output generation unit 120 to the controller 200-2.

The controller 200-2 includes, in addition to the communication unit 202 and the haptic output unit 204, a sound output unit 220.

The sound output unit 220 outputs sounds on the basis of the received sound output signals. For example, the sound output unit 220 may be a speaker.

3-2. Processing of Information Processing System

Figure 7:
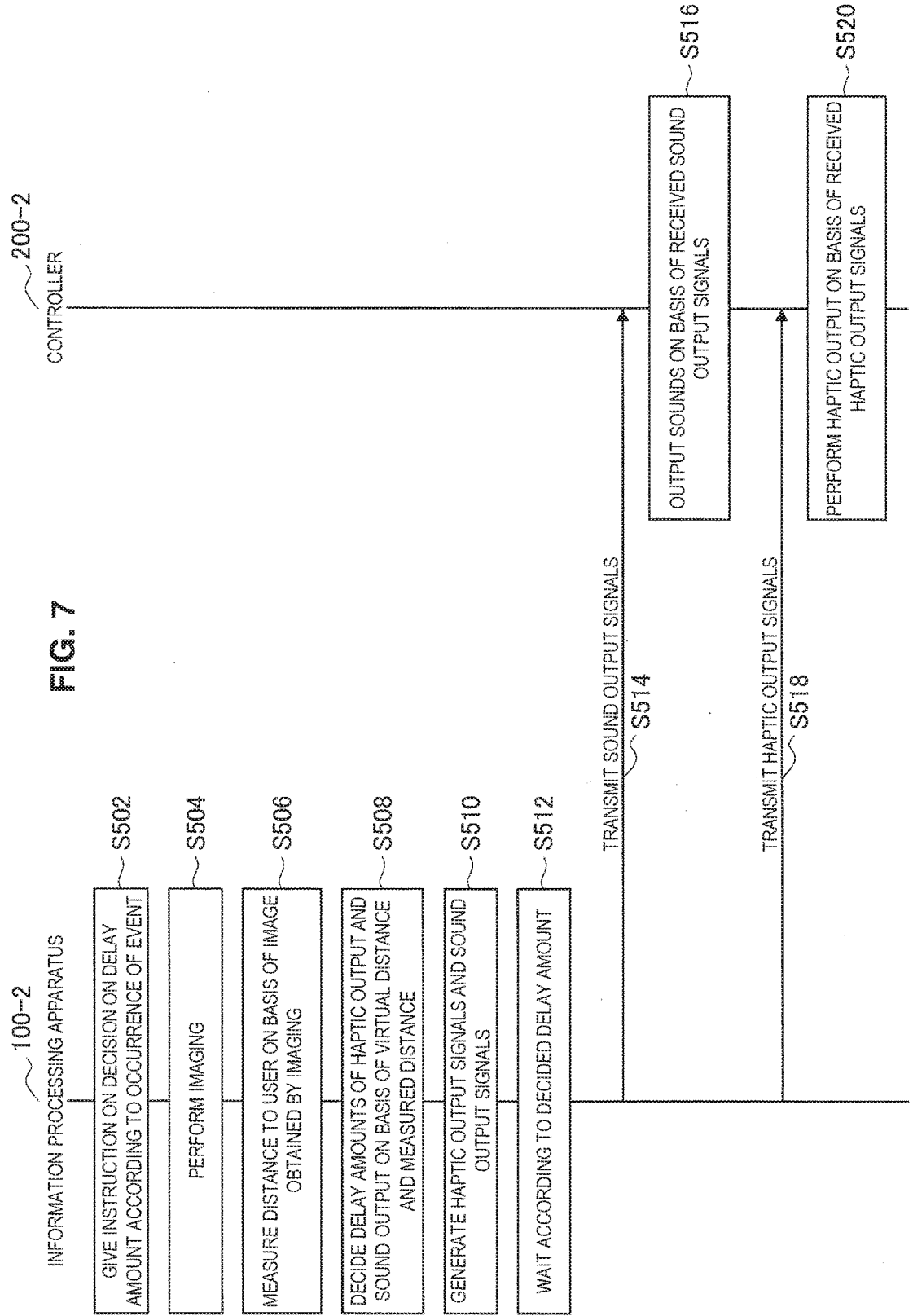
FIG. 7 is a sequence diagram conceptually showing processing of an information processing system according to an embodiment.

Next, processing of the information processing system in the present embodiment will be described with reference to FIG. 7. FIG. 7 is a sequence diagram conceptually showing the processing of the information processing system according to the present embodiment. Note that a detailed description of processing that is substantially the same as that of the information processing system in the first embodiment will be omitted.

First, the information processing apparatus 100-2 gives an instruction on the decision on the delay amount according to the occurrence of the event (step S502). Specifically, when receiving the sound output instruction based on the event that has occurred in the virtual space from the application that performs processing for the virtual space, the sound output generation unit 120 gives an instruction on the decision on the delay amount of the sound output to the delay amount decision unit 104. When receiving the haptic output instruction, the haptic output generation unit 102 gives an instruction on the decision on the delay amount of the haptic output, as in the first embodiment.

Next, the information processing apparatus 100-2 performs imaging (step S504), and then measures the distance to the user on the basis of the image obtained by imaging (step S506).

Next, the information processing apparatus 100-2 decides the delay amounts of the haptic output and the sound output on the basis of the virtual distance and the measured distance (step S508). Specifically, the delay amount decision unit 104 decides the delay amount of the sound output on the basis of the distance obtained by adding the measured distance to the calculated virtual distance and the sound speed stored in the storage unit 110. Further, the delay amount decision unit 104 decides the delay amount of the haptic output as in the first embodiment.

Next, the information processing apparatus 100-2 generates the haptic output signals and the sound output signals (step S510). Specifically, the sound output generation unit 120 generates the sound output signals on the basis of the sound output instruction. Further, the sound output generation unit 120 generates the haptic output signals on the basis of the haptic output instruction.

Next, the information processing apparatus 100-2 waits according to the decided delay amounts (step S512). Specifically, the sound output control unit 122 waits to cause the communication unit 114 to transmit the sound output signals until a period of time corresponding to the delay amount decided by the delay amount decision unit 104 elapses. Further, the haptic output control unit 112 waits to cause the communication unit 114 to transmit the haptic output signals, as in the first embodiment.

Next, the information processing apparatus 100-2 transmits the sound output signals (step S514). Specifically, the communication unit 114 transmits the sound output signals to the controller 200-2 on the basis of a transmission instruction of the sound output control unit 122.

The controller 200-2 outputs sounds on the basis of the received sound output signals (step S516). Specifically, the sound output unit 220 generates sounds on the basis of the sound output signals received by the communication unit 202.

Next, the information processing apparatus 100-2 transmits the haptic output signals (step S518).

The controller 200-2 performs the haptic output on the basis of the received haptic output signals (step S520).

In this manner, according to the second embodiment of the present disclosure, the information processing system further decides the delay amount of the sound output from the occurrence of the event on the basis of the event occurring position in the virtual space, and delays the sound output according to the decided delay amount of the sound output. Accordingly, since the haptic output and the sound output are delayed, it becomes possible to further increase the sense of distance to the event occurring position in the virtual space.

3-3. Modification Example

The second embodiment of the present disclosure has been described above. Note that the present embodiment is not limited to the example described above. Modification examples of the present embodiment will be described below.

As a modification example of the present embodiment, the distance measurement unit 106 may measure the distance to the position of the user on the basis of the sound of the user. Specifically, the information processing apparatus 100-2 further includes a sound collection unit, and the distance measurement unit 106 detects the position of the user on the basis of the sound of the user collected by the sound collection unit. For example, when receiving an instruction on the measurement of the distance from the delay amount decision unit 104, the distance measurement unit 106 can instruct the imaging unit 108 to perform imaging. Then, the distance measurement unit 106 can compare the intensity of the sound collected by the sound collection unit with the intensity of the sound obtained at a predetermined distance so as to calculate the distance from the display screen to the user. Note that the sound collection unit may be a microphone, and the intensity of the sound obtained at a predetermined distance may be stored in the storage unit 110 in advance. Further, a microphone array may be used as the sound collection unit, and the distance measurement unit 106 may measure the position of the user with respect to the display screen on the basis of the thus calculated distance to the user and delay between a plurality of sounds collected by the microphone array.

In this manner, according to the modification example of the present embodiment, the distance measurement unit 106 measures the distance to the position of the user on the basis of the sound of the user. Accordingly, in a case in which the information processing apparatus 100-2 does not include the imaging unit 108 or in a case in which the information processing apparatus 100-2 is installed in an environment that is not suitable for imaging, for example, it becomes possible to measure the distance to the user.

4. Third Embodiment of Present Disclosure
Example of Performing Output Control in Controller Next, an information processing system according to a third embodiment of the present disclosure will be described. In the information processing system according to the present embodiment, an information processing apparatus 100-3 transmits the decided delay amount to a controller 200-3, and the controller 200-3 performs the haptic output after a period of time based on the decided delay amount elapses.

4-1. Configuration of Information Processing System

Figure 8:
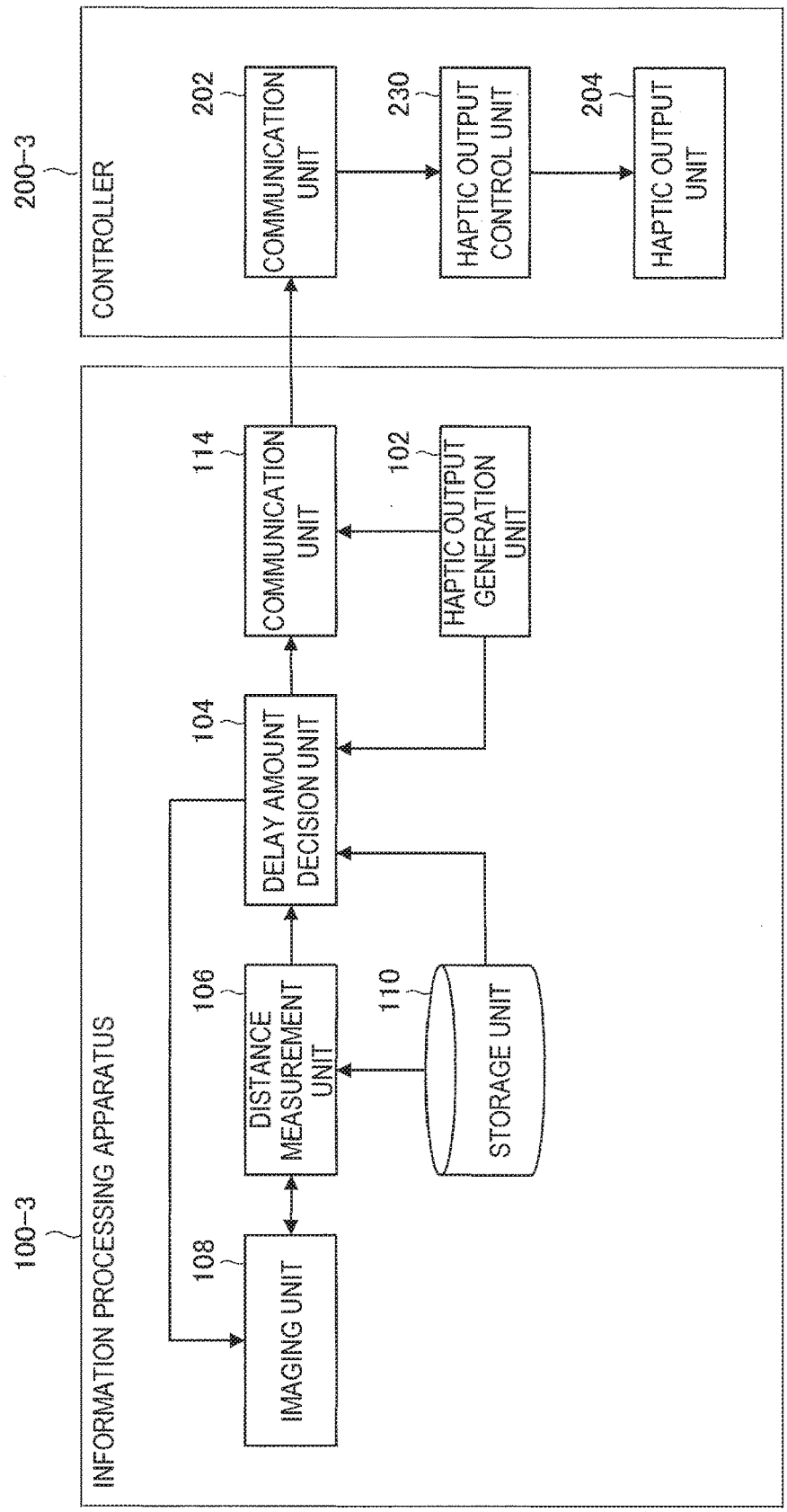
FIG. 8 is a block diagram showing a schematic functional configuration of an information processing system according to a third embodiment of the present disclosure.

First, a configuration of the information processing system according to the third embodiment of the present disclosure will be described with reference to FIG. 8. FIG. 8 is a block diagram showing a schematic functional configuration of the information processing system according to the present embodiment.

As shown in FIG. 8, the information processing apparatus 100-3 includes the haptic output generation unit 102, the delay amount decision unit 104, the distance measurement unit 106, the imaging unit 108, the storage unit 110, and the communication unit 114.

The communication unit 114 transmits the delay amount of the haptic output and the haptic output signals to the controller 200-3. Specifically, when receiving the delay amount of the haptic output from the delay amount decision unit 104 and the haptic output signals from the haptic output generation unit 102, the communication unit 114 transmits the delay amount of the haptic output and the haptic output signals to the controller 200-3 without waiting.

The controller 200-3 includes, in addition to the communication unit 202 and the haptic output unit 204, a haptic output control unit 230.

The haptic output control unit 230 controls timing of the haptic output on the basis of the delay amount of the haptic output received by the communication unit 202. Specifically, the haptic output control unit 230 provides the received haptic output signals to the haptic output unit 204 after a period of time according to the received delay amount of the haptic output elapses.

4-2. Processing of Information Processing System

Figure 9:
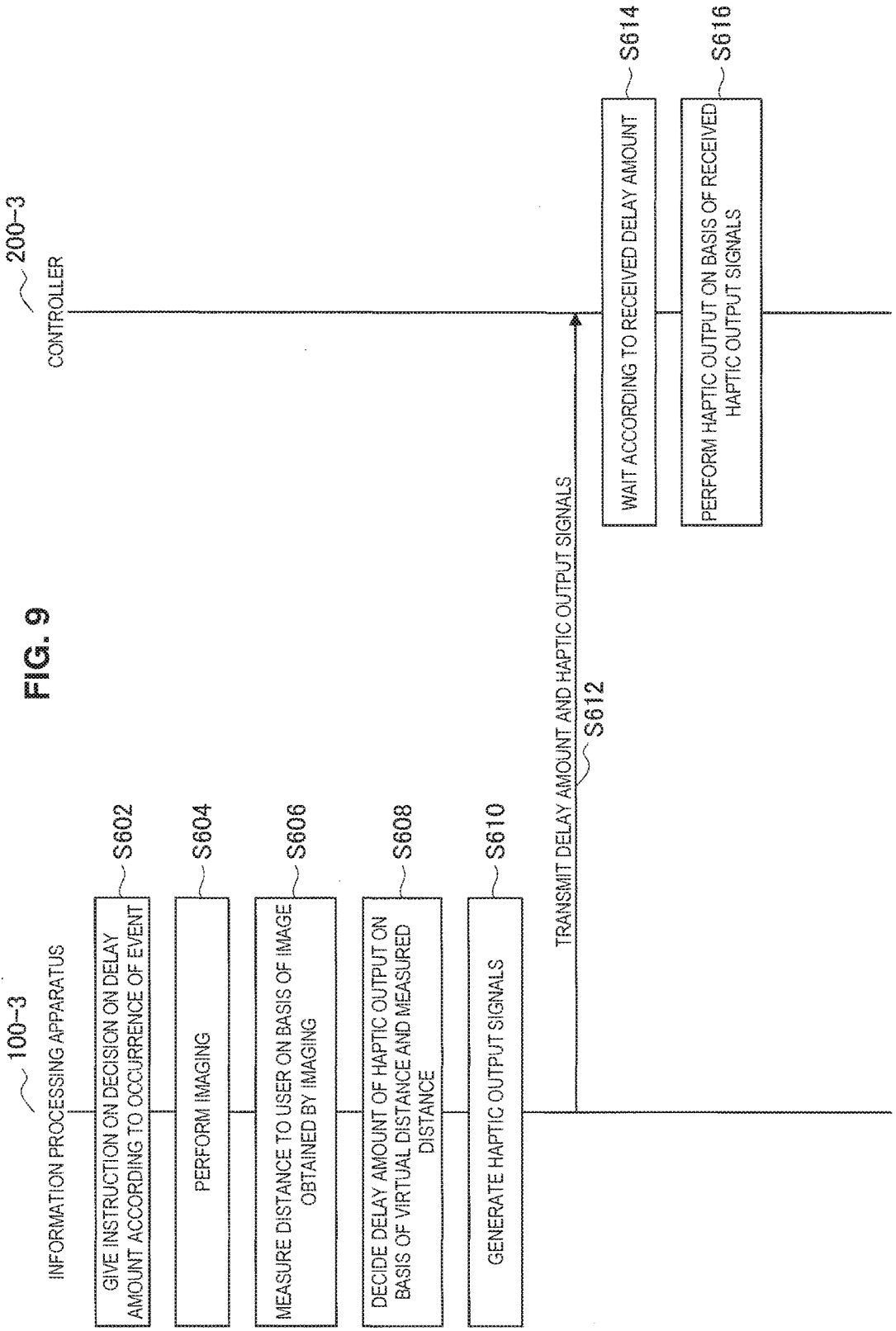
FIG. 9 is a sequence diagram conceptually showing processing of an information processing system according to an embodiment.

Next, processing of the information processing system in the present embodiment will be described with reference to FIG. 9. FIG. 9 is a sequence diagram conceptually showing the processing of the information processing system according to the present embodiment. Note that a detailed description of processing that is substantially the same as that of the information processing system in the first embodiment will be omitted.

First, the information processing apparatus 100-3 gives an instruction on the decision on the delay amount according to the occurrence of the event (step S602), performs imaging (step S604), and then measures the distance to the user on the basis of the image obtained by imaging (step S606). Then, the information processing apparatus 100-3 decides the delay amount of the haptic output on the basis of the virtual distance and the measured distance (step S608), and generates the haptic output signals (step S610).

Next, the information processing apparatus 100-3 transmits the delay amount and the haptic output signals to the controller 200-3 (step S612). Specifically, the communication unit 114 transmits the delay amount of the haptic output decided by the delay amount decision unit 104 and the haptic output signals generated by the haptic output generation unit 102 to the controller 200-3.

Next, the controller 200-3 waits according to the received delay amount (step S614). Specifically, the haptic output control unit 230 waits until a period of time corresponding to the received delay amount elapses.

The controller 200-3 performs the haptic output on the basis of the received haptic output signals (step S616). Specifically, the haptic output control unit 230 provides the haptic output signals to the haptic output unit, and the haptic output unit 204 generates vibrations on the basis of the provided haptic output signals.

In this manner, according to the third embodiment of the present disclosure, the information processing apparatus 100-3 transmits the decided delay amount of the haptic output to the controller 200-3, and the controller 200-3 performs the haptic output after a period of time based on the received delay amount of the haptic output elapses. Accordingly, since communication does not occur after a delayed time elapses, it becomes possible to prevent the generation of an unintentional delay due to communication.

5. Hardware Configuration

Embodiments of the present disclosure have been described above. The processing of the information processing apparatus 100 described above is implemented by cooperation between software and hardware of the information processing apparatus 100 described below.

Figure 10:
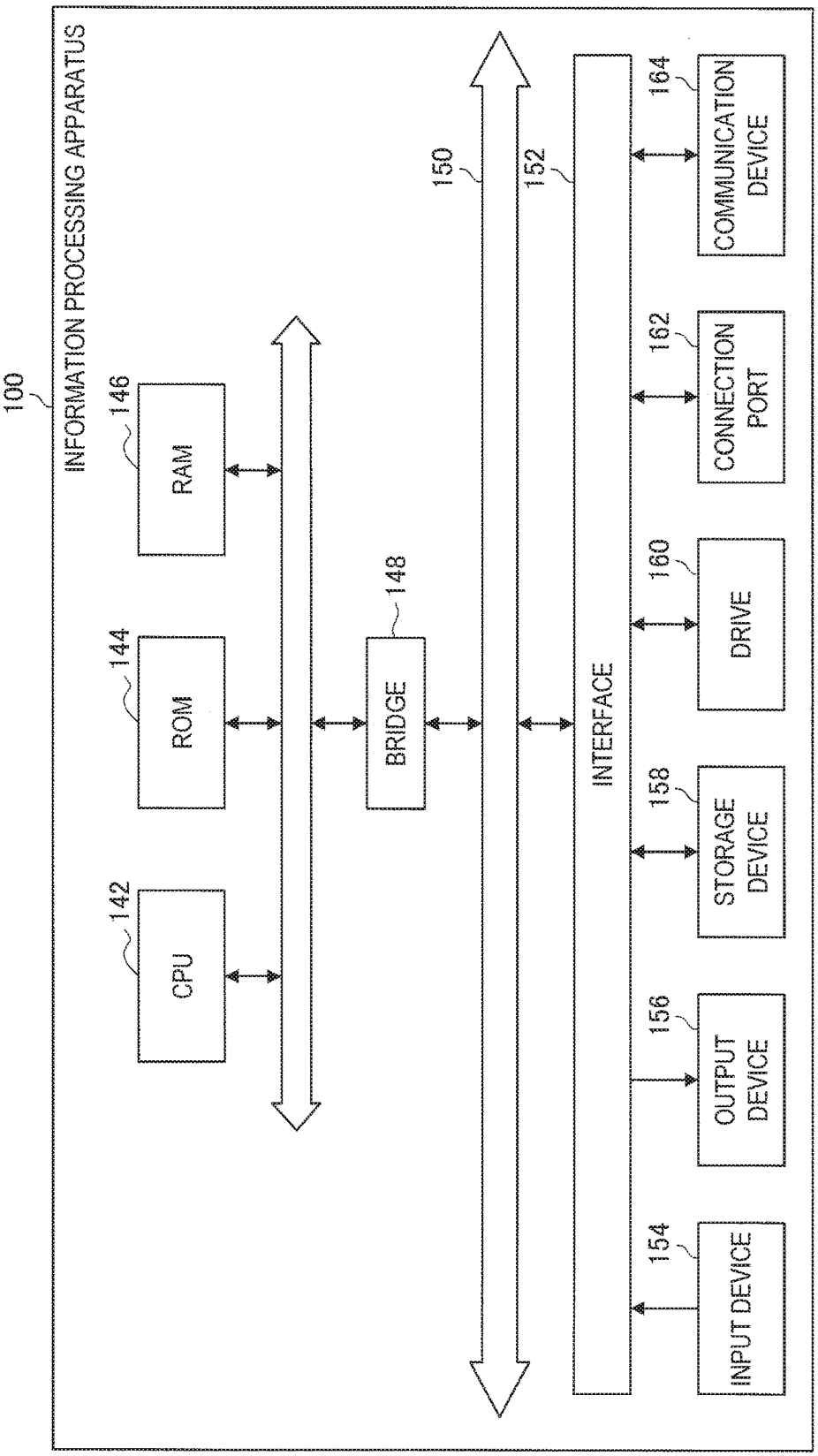
FIG. 10 is an explanatory diagram showing a hardware configuration of an information processing apparatus according to an embodiment of the present disclosure.

FIG. 10 is an explanatory diagram showing a hardware configuration of the information processing apparatus 100 according to an embodiment of the present disclosure. As illustrated in FIG. 10, the information processing apparatus 100 includes a central processing unit (CPU) 142, read only memory (ROM) 144, random access memory (RAM) 146, a bridge 148, a bus 150, an interface 152, an input device 154, an output device 156, a storage device 158, a drive 160, a connection port 162, and a communication device 164.

The CPU 142 functions as an arithmetic processing device and a control device and cooperates with various programs to thereby realize the operations of the haptic output generation unit 102, the delay amount decision unit 104, the distance measurement unit 106, the haptic output control unit 112, the sound output generation unit 120, and the sound output control unit 122 in the information processing apparatus 100. The CPU 142 may be a microprocessor. The ROM 144 stores programs, operation parameters, or the like to be used by the CPU 142. The RAM 146 temporarily stores programs for use in the execution of the CPU 142, parameters which change as appropriate in the execution, and the like. By the ROM 144 and the RAM 146, a part of the storage unit 110 in the information processing apparatus 100 is realized. The CPU 142, the ROM 144, and the RAM 146 are connected to each other through an internal bus constituted by a CPU bus and the like.

The input device 154 is constituted by, as an example of the imaging unit 108 of the information processing apparatus 100, for example, an input unit which allows the user to input information, such as a camera, a mouse, a keyboard, a touch panel, a button, a microphone, a camera, a switch, and a lever, an input control circuit which generates an input signal based on an imaging by a camera or an input by the user, and then outputs the signal to the CPU 142, and the like. The user of the information processing apparatus 100 can operate the input device 154 to input various data to the information processing apparatus 100 or instruct the information processing apparatus 100 to perform a processing operation.

The output device 156 performs an output operation to a device, such as a liquid crystal display (LCD), an organic light emitting diode (OLED), and a lamp. Furthermore, the output device 156 may include a loudspeaker and a headphone for outputting sounds.

The storage device 158 is a device for data storage. The storage device 158 may include a storage medium, a recording device for recording data in the storage medium, a reading device for reading the data from the storage medium, and a deleting device for deleting data recorded in the storage medium. The storage device 158 stores a program executed by the CPU 142 and various types of data.

The drive 160 is a reader-writer for a storage medium and is built in or externally attached to the information processing apparatus 100. The drive 160 reads out information recorded on a removable storage medium that is attached thereto, such as a magnetic disk, an optical disk, a magneto-optical disk, or a semiconductor memory, and then outputs the information to the RAM 146. The drive 160 is also able to write information to a removable storage medium.

The connection port 162 is a bus for connection with an information processing apparatus or peripheral devices provided outside the information processing apparatus 100. The connection port 162 may be universal serial bus (USB).

The communication device 164 is, as an example of the communication unit 114 of the information processing apparatus 100, a communication interface constituted by a communication device for connection with a network. The communication device 164 may be an infrared communication compatible device, a wireless local area network (LAN) compatible communication device, a long-term evolution (LTE) compatible communication device, or a wired communication device that performs communication through wire.

6. Conclusion

As described above, according to the first embodiment of the present disclosure, the timing of the haptic output is changed depending on the event occurring position in the virtual space, so that it becomes possible to increase the user's sense of distance to the event that occurs in the virtual space. According to the second embodiment of the present disclosure, the haptic output and the sound output are delayed, so that it becomes possible to further increase the sense of distance to the event occurring position in the virtual space. According to the third embodiment of the present disclosure, communication does not occur after the delayed time elapses, so that it becomes possible to prevent the generation of an unintentional delay due to communication.

Hereinabove, although the preferred embodiments of the present disclosure have been described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

It should be noted that in the present disclosure, the operations described in the sequence diagram may be performed not only in time series in the described order but in parallel or individually. Further, it should be understood that the operations performed in time series may be performed in a different order from the described order.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:
a delay amount decision unit configured to decide a delay amount of a haptic output from occurrence of an event on the basis of an event occurring position in a virtual space; and
a haptic output control unit configured to delay the haptic output according to the delay amount decided by the delay amount decision unit.

(2) The information processing apparatus according to (1),
wherein the delay amount decision unit decides the delay amount on the basis of a virtual distance from the event occurring position to a front display end surface of the virtual space.

(3) The information processing apparatus according to (2),
wherein the delay amount decision unit decides the delay amount on the basis of a distance obtained by adding a correction distance to the virtual distance.

(4) The information processing apparatus according to (3),
wherein the correction distance is a distance from a display screen to a user in a real space.

(5) The information processing apparatus according to (4), further including:

a distance decision unit configured to decide the correction distance on the basis of an image or a sound related to the user.

(6) The information processing apparatus according to (3),
wherein the correction distance is a set certain distance.

(7) The information processing apparatus according to (6),
wherein the certain distance is set by an operation by the user.

(8) The information processing apparatus according to any one of (1) to (7),
wherein the delay amount decision unit decides the delay amount on the basis of a medium of the virtual space.

(9) The information processing apparatus according to any one of (1) to (8),
wherein the haptic output is an output of a haptic vibration.

(10) The information processing apparatus according to any one of (1) to (8),
wherein the haptic output is an output of a heat.

(11) The information processing apparatus according to any one of (1) to (10), further including:
a sound output control unit configured to control a sound output,
wherein the delay amount decision unit further decides a delay amount of the sound output from the occurrence of the event on the basis of the event occurring position in the virtual space, and
wherein the sound output control unit delays the sound output according to the delay amount decided by the delay amount decision unit.

(12) An information processing system including:
a delay amount decision unit configured to decide a delay amount of a haptic output from occurrence of an event on the basis of an event occurring position in a displayed virtual space; and
a haptic output control unit configured to delay the haptic output according to the delay amount.

(13) The information processing system according to (12),
wherein the delay amount decision unit is provided in an information processing apparatus including a communication unit configured to transmit the delay amount, and
wherein the haptic output control unit is provided in an output apparatus including a communication unit configured to receive the delay amount transmitted from the information processing apparatus.

(14) An information processing method including:
deciding a delay amount of a haptic output from occurrence of an event on the basis of an event occurring position in a virtual space; and
delaying the haptic output according to the decided delay amount.

(15) A program for causing a computer to realize:
a delay amount decision function of deciding a delay amount of a haptic output from occurrence of an event on the basis of an event occurring position in a virtual space; and
a haptic output control function of delaying the haptic output according to the delay amount decided by the delay amount decision function.

What is claimed is:
1. An information processing apparatus, comprising:
a Central Processing Unit (CPU) configured to:
determine a haptic delay time of a haptic output based on a virtual distance between a user viewpoint posi- tion and an occurrence position of a virtual event and based on a distance from a display screen to a user position in a real space;

control display of a visual output on the display screen, output of a sound output by a sound output device, and output of the haptic output by a vibration actuator;

delay the haptic output based on the determined haptic delay time, wherein the determined haptic delay time elapses from a time at which the visual output of the virtual event is displayed on the display screen; and control the vibration actuator to generate the delayed haptic output based on the virtual event, wherein the vibration actuator is different from the sound output device.

2. The information processing apparatus according to claim 1, wherein the visual output of the virtual event includes an image in which the occurrence position of the virtual event is away from the user viewpoint position.

3. The information processing apparatus according to claim 1, wherein the virtual event comprises an explosion event, and wherein the haptic output corresponds to a blast of the explosion event.

4. The information processing apparatus according to claim 1, wherein the vibration actuator comprises one of an eccentric motor and a linear resonant actuator.

5. The information processing apparatus according to claim 1, wherein the sound output device comprises at least one of a speaker and a headphone.

6. The information processing apparatus according to claim 1, wherein the CPU is further configured to delay the sound output based on a delay time of the sound output.

7. The information processing apparatus according to claim 6, wherein the delay time of the sound output is different from the determined haptic delay time of the haptic output.

8. The information processing apparatus according to claim 1, wherein the CPU is further configured to determine the haptic delay time based on a medium of a virtual space in which the virtual event occurs.

9. The information processing apparatus according to claim 8, wherein the medium of the virtual space comprises water.

10. An information processing method, comprising:

determining a haptic delay time of a haptic output based on a virtual distance between a user viewpoint position and an occurrence position of a virtual event and based on a distance from a display screen to a user position in a real space;

controlling display of a visual output on the display screen, output of a sound output by a sound output device, and output of the haptic output by a vibration actuator;

delaying the haptic output based on the determined haptic delay time, wherein the determined haptic delay time elapses from a time at which the visual output of the virtual event is displayed on the display screen; and controlling the vibration actuator to generate the delayed haptic output based on the virtual event, wherein the vibration actuator is different from the sound output device.

11. The information processing method of claim 10, wherein the visual output of the virtual event includes an image in which the occurrence position of the virtual event is away from the user viewpoint position.

12. The information processing method of claim 10, wherein the virtual event comprises an explosion event, and wherein the haptic output corresponds to a blast of the explosion event.

13. The information processing method of claim 10, wherein the sound output device comprises at least one of a speaker and a headphone.

14. The information processing method of claim 10, further comprising delaying the sound output based on a delay time of the sound output.

15. The information processing method of claim 14, wherein the delay time of the sound output is different from the determined haptic delay time of the haptic output.

16. The information processing method of claim 10, further comprising determining the haptic delay time based on a medium of a virtual space in which the virtual event occurs.

17. The information processing method of claim 16, wherein the medium of the virtual space comprises water.

18. A non-transitory computer-readable medium having stored thereon computer-executable instructions that, when executed by a computer, cause the computer to perform operations, the operations comprising:

determining a haptic delay time of a haptic output based on a virtual distance between a user viewpoint position and an occurrence position of a virtual event and based on a distance from a display screen to a user position in a real space;

controlling display of a visual output on the display screen, output of a sound output by a sound output device, and output of the haptic output by a vibration actuator;

delaying the haptic output based on the determined haptic delay time, wherein the determined haptic delay time elapses from a time at which the visual output of the virtual event is displayed on the display screen; and controlling the vibration actuator to generate the delayed haptic output based on the virtual event, wherein the vibration actuator is different from the sound output device.

* * * * *